Sept. 29, 1953 J. R. OISHEI 2,653,444
ACCESSORY SYSTEM AND FILTER THEREFOR
Filed April 8, 1950
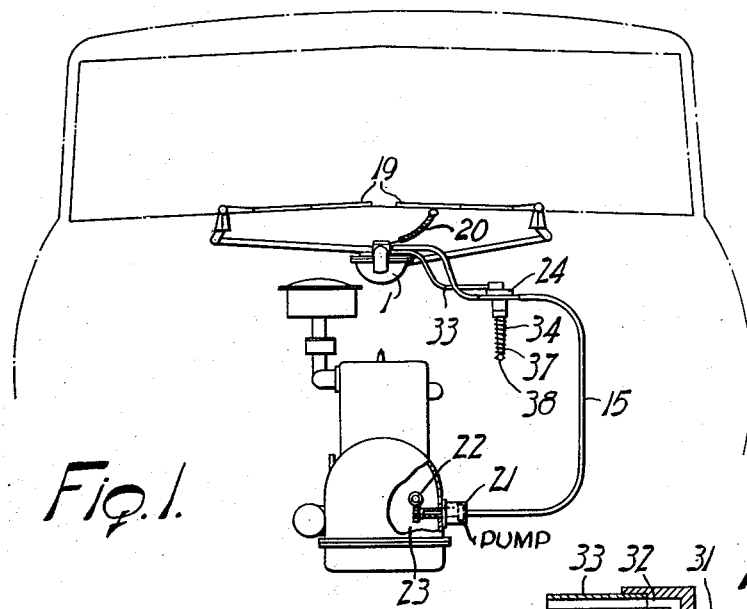
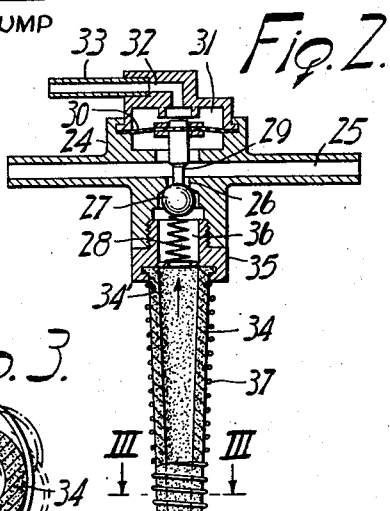
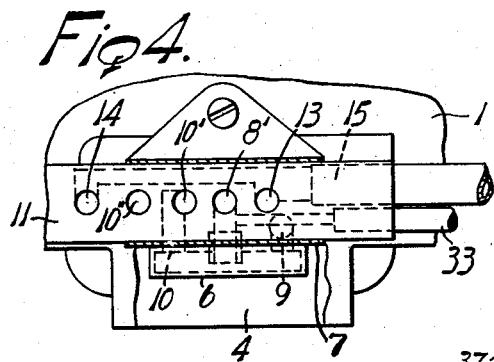
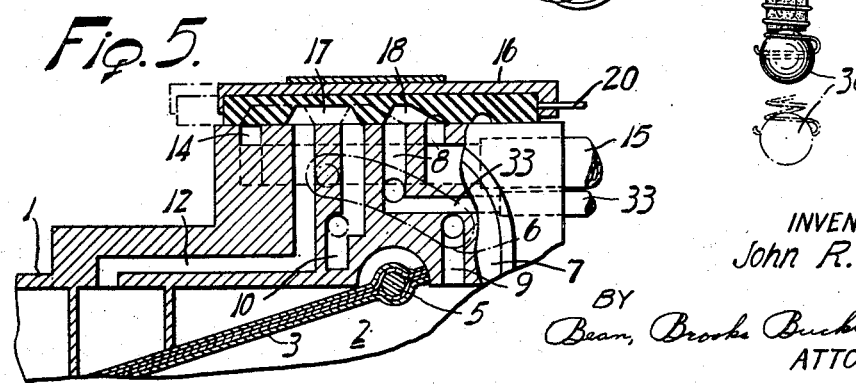
INVENTOR
John R. Oishei
BY
Bean, Brooks Buckley & Bean.
ATTORNEYS Patented Sept. 29, 1953

2,653,444

UNITED STATES PATENT OFFICE 2,653,444

ACCESSORY SYSTEM AND FILTER THEREFOR

John R. Oishei, Buffalo, N. Y.

Application April 8, 1950, Serial No. 154,803

3 Claims. (Cl. 60—19)

This invention relates to the motor vehicle art and especially to the accessory field thereof, the primary object of the invention being to combine an accessory system of the fluid or suction operated type with the power plant of a vehicle in a manner to improve the efficiency of the power plant as well as that of the accessory.

The air exhaust from a suction actuated accessory has heretofore been discharged into the crankcase with provision being made to continue an airflow through the crankcase for the ventilation thereof when the use of the accessory has ceased. The accessory has its own air filter but during the periods of accessory inactivity it is also necessary to have clean air circulating through the crankcase.

The aim of this invention is to provide a practical means by which the ventilating air may be purified and filtered in a satisfactory manner. Again, the invention will be found to reside in an air filter which is maintained fully effective by a self-cleaning construction that is efficient for its intended purpose.

The foregoing and other objects will manifest themselves as this description progresses, reference being made to the accompanying drawing wherein Fig. 1 is a diagrammatic layout of an accessory system embodying the present invention;

Fig. 2 is a sectional view, partly in elevation, of the improved automatic venting unit;

Fig. 3 is a cross sectional view of the unit, as viewed about on line 3—3 of Fig. 2; and Figs. 4 and 5 are fragmentary views of the accessory control.

Referring more particularly to the drawing, the numeral 1 designates an automobile accessory, such as a windshield cleaner, having a fluid operated motor with a chamber 2 and a piston 3. By reason of automatic valve mechanism, operating in the chamber 4 under the action of the piston oscillated shaft 5, a valve 6 is rocked back and forth upon its seat 7 to connect a suction port 8 alternately to two chamber ports 9 and 10.

The ports 8 and 10 are connected by ducts to ports 8' and 10' in a valve seat 11 of a control valve assemblage. A third port 10'' opens through the seat 11 and communicates with the piston chamber 2 at the opposite side of the piston as does the chamber port 9. Two suction supply ports 13 and 14 open through the seat 11 from a supply line conduit 15. The valve 16 is formed in its face with spaced recesses 17 and 18 designed in one position to connect the ports, as depicted by the solid lines in Fig. 5 for the running of the motor, and in a second position to connect the ports in a different arrangement as indicated by the broken line showing in Fig. 5, for arresting the motor and parking the connected wipers 19, the valve 16 being shiftable from one position to the other by a push-pull wire 20.

A rotary pump 21 constitutes a source of negative pressure and is driven from the engine cam shaft 22. It discharges into the crankcase 23 for producing a ventilating airflow therethrough and its inlet is connected to the accessory by the conduit 15.

Interposed in the conduit 15 is an automatic venting unit or means 24 which normally opens the outside atmosphere to the pump, whenever the accessory is not in use, for insuring the maintenance of the ventilating airflow through the crankcase though in a bypass relation to the accessory, the crankcase having a suitable breather opening, not shown. The venting unit has a through-passage 25 and a venting port 26 opening thereinto, the passage constituting a part of the conduit 15. The vent 26 is closed during accessory operation by a spring seated valve 27 and is opened at other times against the urge of its spring 28 by a pin 29. The pin is carried by a diaphragm 30 which operates in a chamber 31 as an auxiliary motor and has a suction port 32 connected by a passage 33 to the suction port 8 of the control valve. Therefore, when the control valve is in its running position, the negative pressure maintains not only in the through-passage 25 but also in the passage 33 to fluid balance the diaphragm 30 with the result that the spring 28 will be free to seat the valve 27 and close off the atmospheric vent. When the control valve is in its wiper parking and motor arresting position, the chamber 31 will be opened to the atmosphere through the uncovered port 10 and the valve chamber 4 while the underside of the diaphragm will be subatmospheric. Therefore, the auxiliary motor will unseat the valve 27 against its spring 28.

To filter out any impurities from the ventilating air stream the venting passage 26 is provided with a filter body 34. It is made removable by mounting it in a base 35 that has threaded connection with the body of the automatic venting unit. This arrangement enables displacement of the filter and gives access to the valve and its chamber 36. The filter body is self-sustaining in character and preferably tapered outwardly. It may be formed from sintering metal under sufficient pressure to give it the desired porosity.

The filter is rendered self-cleaning by an extensible spring frame 37 that is formed of spring wire suitably coiled about and conformably fitting the tapered form of the filter body. Anchored loosely at its upper end in a peripheral groove 34' in the filter body, the extensible spring frame dangles about the latter preferably in scraping contact therewith and supports an inertia member in the form of a weight 38 which when jarred or shaken, as by the engine vibration or during vehicular motion over an irregular road surface, will vibrate up and down to distend the wire body and cause its convolutions to wipe over the outer surface of the filter body to dislodge or scrape off any impurities which may be adhering thereto. The vibrating weight will rebound and strike against the lower closed end of the filter body with a jarring impact to further assist in loosening and freeing the impurities from the filter body. Being of coiled formation the convolutions of the cleaning frame will tend to unwind during distension and therefore it will twist and turn about the filter circumferentially to scrape different surface portions thereof. Furthermore, since the coiled cleaning frame is loose on the filter body it may freely rotate thereabout in response to the vibration. By slightly flattening the convolutions, the opposite portions of each convolution may be caused to press upon the filter body with a regulated pressure, as depicted in Fig. 3. The cleaning action is responsive to the engine vibrations as well as the vehicle vibration. Since the cleaning frame is carried by the filter body, the two constitute a replaceable unit in effecting repair.

Being self-cleaning in character, a purified airstream will be assured over a long period of use. The invention is practical and will insure greater efficiency from the power plant and the accessory, and while the foregoing description has been given in detail it is not by way of limitation since the inventive principles involved are capable of assuming other physical embodiments without departing from the spirit of the invention and the scope of the appended claims.

What is claimed is:

1. A motor vehicle having an engine of the internal combustion type with a crankcase, an air pump driven by the engine as a supply of suction and having its outlet discharging into the crankcase, a suction actuated accessory connected by a passage to the pump, a control valve for the accessory, an automatic venting means for the passage responsive to a predetermined pressure differential set up by the control valve when discontinuing the use of the accessory for opening the passage to the atmosphere, and vibration responsive means for maintaining a clean inflow of air through the open venting means.

2. An automatic vent for automotive accessory systems, comprising a body having a venting passage, a replaceable porous filter body mounted over the venting passage, and an engine vibrated cleaning frame of spring coils encircling the filter body and carried thereby for replacement therewith as a unit, said coiled frame being anchored at one end to the body and having its opposite end extended beyond the body and supporting an inertia member responsive to vibration and acting with a jarring impact against the adjacent part of the body.

3. A motor vehicle having an engine of the internal combustion type with a crankcase, an air pump driven by the engine as a supply of suction and having its outlet discharging into the crankcase, a suction actuated accessory connected by a passage to the pump, a control valve for the accessory, an automatic venting valve for the passage responsive to a predetermined pressure differential set up by the control valve when discontinuing the use of the accessory for opening the passage to the atmosphere, and an engine actuated member operable for maintaining a clean inflow of air through the open venting valve.

JOHN R. OISHEI.

References Cited in the file of this patent

UNITED STATES PATENTS

| Number | Name | Date |
| --- | --- | --- |
| 1,324,635 | Ascoli | Dec. 9, 1919 |
| 1,564,178 | Orem | Dec. 1, 1925 |
| 1,757,834 | Haegler | May 6, 1930 |
| 2,157,596 | Davis | May 9, 1939 |
| 2,165,181 | Horton | July 4, 1939 |
| 2,392,458 | Carlson | Jan. 8, 1946 |
| 2,484,139 | Witchger | Oct. 11, 1949 |